Aug. 4, 1936.   C. N. BEBINGER   2,050,153
OSCILLATING TURN FOR CONVEYERS
Filed July 23, 1935   2 Sheets-Sheet 1

Inventor
C. N. Bebinger
By Frease and Bishop
Attorneys

Aug. 4, 1936.  C. N. BEBINGER  2,050,153
OSCILLATING TURN FOR CONVEYERS
Filed July 23, 1935  2 Sheets-Sheet 2

Inventor
C. N. Bebinger
By Frease and Bishop
Attorneys

Patented Aug. 4, 1936

2,050,153

UNITED STATES PATENT OFFICE 2,050,153

OSCILLATING TURN FOR CONVEYERS

Charles N. Bebinger, New Philadelphia, Ohio, assignor to La-Del Conveyor & Mfg. Co., New Philadelphia, Ohio, a corporation of Ohio Application July 23, 1935, Serial No. 32,736

12 Claims. (Cl. 198—220)

The invention relates to shaking or reciprocating conveyers, and more particularly to a unitary corner or turn construction for use at corners or angles of shaking conveyers.

Prior conveyer turn constructions of which I am aware provide a curved corner pan connecting the line conveyers forming the corner, and the corner pan is arranged to travel in the path of an arc described about a laterally spaced pivot. During the reciprocating movement of the conveyer, the arcuate movement of the corner pan causes lateral movement of the troughs in the line conveyers, which detracts from the longitudinal conveying action and requires excessive driving power.

This lateral movement of the line troughs also tends to bend or break the connections between the troughs or bend the troughs themselves, misaligns the carriages on which the troughs are carried, and puts undue strain on the anchoring means which hold the corner pan supports and the trough carriages.

Accordingly, it is an object of the present invention to provide a corner construction for a shaking conveyer which will prevent lateral movement in the line conveyers during their reciprocating movement, and which will increase the effectiveness of the longitudinal conveying action.

Another object is to provide a unitary conveyer turn construction having means in addition to the corner pan for positively transmitting longitudinal reciprocating movement from one line conveyer to the other.

A further object is to provide a conveyer turn construction in which the corner pan does not have a laterally spaced pivot.

Another object is to provide a unitary conveyer turn construction having a base supporting the corner pan and the line troughs connected thereto, without requiring a laterally spaced pivotal support or any auxiliary supports.

A still further object is to embody all of the foregoing advantageous features in a simple and inexpensive construction, which provides anchoring points on opposite sides of the corner pan, and which is capable of being quickly connected to and disconnected from line conveyers in everyday use.

These and other objects are attained by the novel construction comprising the present invention, which is hereinafter described in detail and defined in the appended claims.

In general terms, the present invention includes the provision of guides for maintaining the line troughs to which the corner pan is connected in longitudinal alignment during reciprocation, and a link pivotally connected at its ends to the line troughs for transmitting longitudinal reciprocating movement from one line conveyer to the other.

Referring to the drawings

Similar numerals refer to similar parts throughout the drawing.

Figure 1:
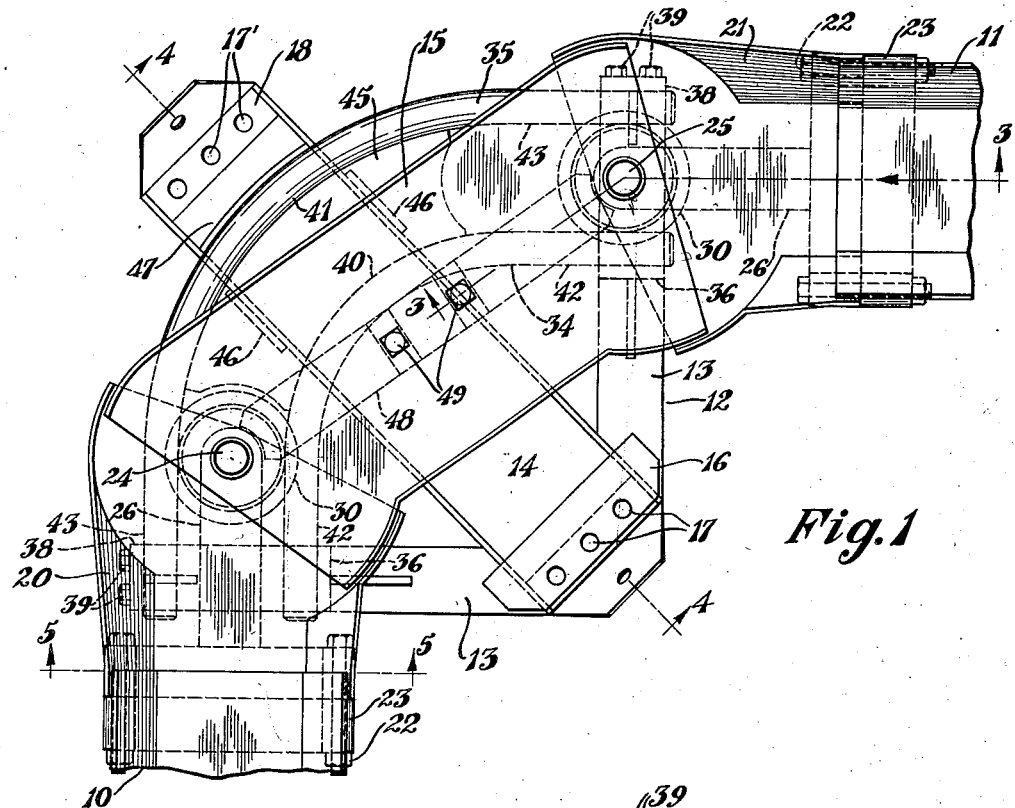
Figure 1 is a plan view of the improved conveyer turn construction forming a right angle turn between two line conveyers, the moving parts being shown at one end of the stroke of the conveyers.

In the drawing, the receiving end of a line conveyer, which may be the driven conveyer, is shown fragmentarily at 10, and the delivery end of another line conveyer at right angles to the line conveyer 10 is shown fragmentarily at 11.

The improved oscillating turn construction preferably includes a base indicated generally at 12 for resting on the floor of a mine and the like, and may include bars 13 extending at right angles to each other, and secured at their inner ends to a diagonal channel member 14 which is adapted to extend under and project beyond the corner pan 15.

At the inner side of the angle between the conveyers, the end of channel 14 may have a plate 16 secured thereon and having holes 17 therein for receiving jacks, and the outer or projecting end of channel 14 may have a plate 18 having holes 17' therein for receiving jacks. Thus, the holes 17 and 17' provide spaced points on opposite sides of the corner pan 15 for receiving jacks to rigidly and solidly support the base from the ceiling of a mine.

The corner pan 15 may be substantially straight as shown and its ends preferably overlap and are pivotally connected to the end troughs 20 and 21, which are in turn secured to line troughs 10 and 11, respectively. The end troughs 20 and 21 are preferably rigidly secured to the line troughs 10 and 11 by means of bolts 22 passing through eye bars 23 on the adjoining ends of the line troughs and end troughs, in a well known manner.

The corner pan 15 is preferably connected at its ends to the end troughs 20 and 21 by means of pivot pins 24 and 25, respectively, on which the corner pan and end troughs are journalled. Preferably, the end troughs 20 and 21 have secured on their underside conveyer supporting members constituting longitudinal bars 26 which are journalled on the upper end portions of pins 24 and 25, respectively, by means of bushings 27, and angle bars 28 are preferably secured one to each longitudinal bar 26 and extend downwardly and forwardly to form horizontal portions 29 which are journalled on the lower portions of pins 24 and 25 by means of bushings 27.

Between each of the bars 26 and the horizontal portions 29 of angle bars 28, a guide wheel 30 is located, and the guide wheels 30 have hub portions 31 which are journalled one on the pivot pin 24 and one on the pivot pin 25.

The guide wheels 30 each have a grooved outer rim 32 which is adapted to engage and roll between horizontally spaced guide rods 34 and 35. The inner guide rod 34 is located inside of the guide wheels 30 and the outer guide rod 35 is located on the outside thereof.

The ends of each of the guide rods 34 and 35 are supported by and secured to the base. The inner rod 34 is secured at its ends to upstanding bracket members 36 as by welding indicated at 37 in Fig. 5, and the brackets 36 are secured to the bars 13 of the base.

Figure 5:
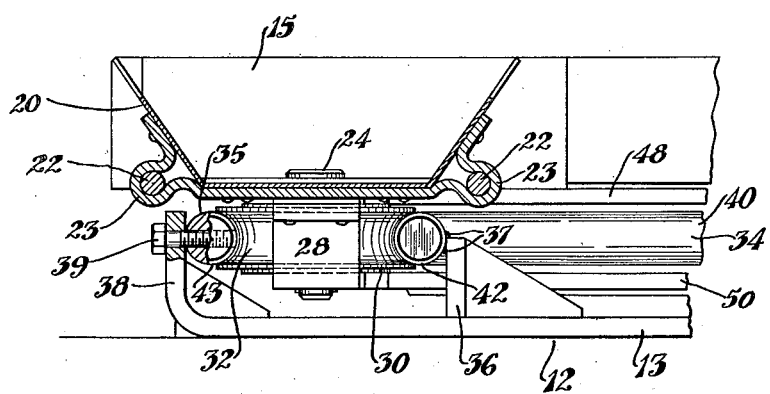
Fig. 5 is an enlarged transverse sectional view taken substantially on line 5—5, Fig. 1.

The ends of the outer guide rod 35 are secured to vertical flange portions 38 of the base bars 13 preferably by means of set screws and the like 39, as best shown in Fig. 5.

The guide rods 34 and 35 are equally spaced throughout their lengths and preferably have curved intermediate portions indicated at 40 and 41 respectively, and have straight end portions 42 and 43 respectively, extending from each end of their curved intermediate portions in a direction parallel to the line conveyer adjacent thereto. The straight line portions 42 and 43 are somewhat longer than the reciprocating stroke of the line conveyers, and the guide wheels 30 are adapted to roll on said straight portions 42 and 43, so that the pivot pins 24 and 25 are positively maintained on the longitudinal axes of the line conveyers 10 and 11 respectively, during their longitudinal reciprocating movement.

The curved portions 40 and 41 of the guide rods may be secured, as by welding, to a stiffening plate 45, which is in turn supported from the channel member 14 by means of vertical plates or bars 46. The curved portion 41 of the outer guide rod 43 may also be supported from the base by means of a bracket member 47.

The improved means for transmitting the longitudinal reciprocating movement from one line conveyer to the other preferably includes oscillating links, the top link being shown at 48 and being secured to the underside of the corner pan preferably by means of bolts 49, and the bottom link being shown at 50. The top link is secured at its ends as by welding, to annular members 52 which are journalled one on the upper part of each hub 31 by means of bushings 53, and the bottom link 50 is secured at its ends to annular members 54 which are journalled on the bottom portions of the hubs 31 of the wheels 30 by means of bushings 55.

Figure 2:
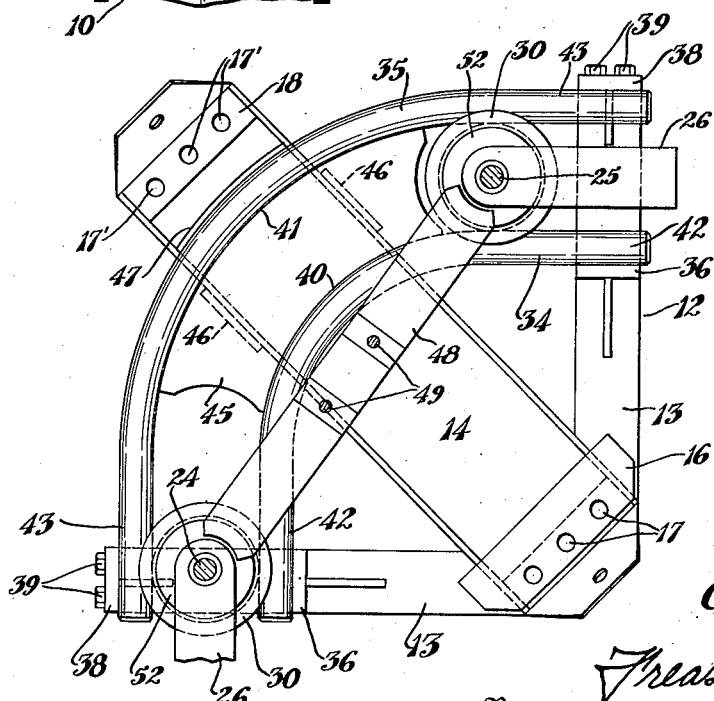
Fig. 2 is a plan sectional view of the improved conveyer turn construction with the troughs and corner pan removed, the moving parts being shown at the other end of the stroke of the conveyers.
Figure 3:
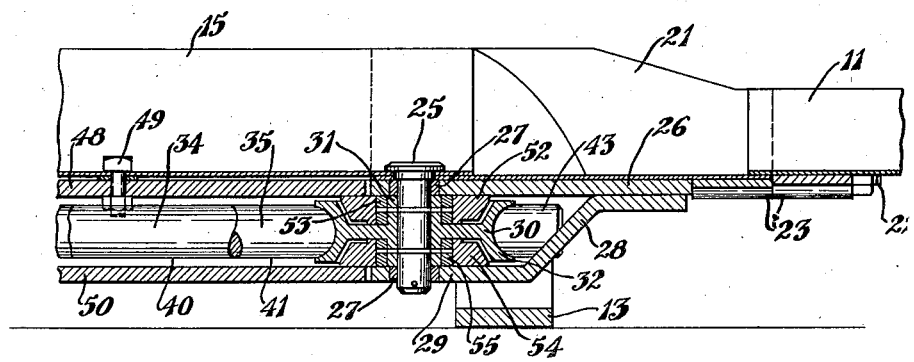
Fig. 3 is an enlarged fragmentary sectional view taken on line 3—3, Fig. 1.
Figure 4:
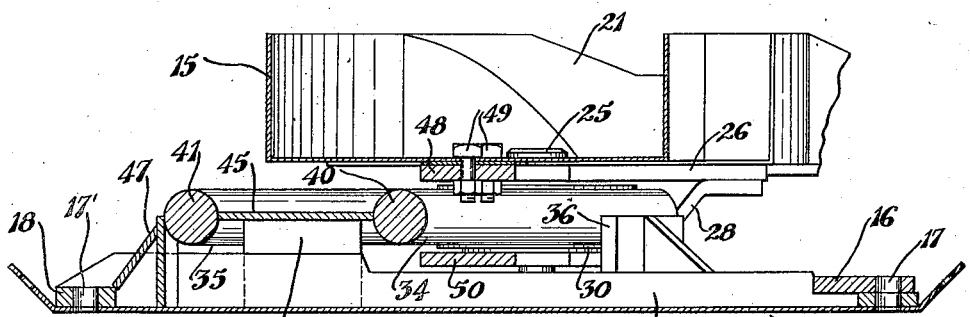
Fig. 4 is an enlarged sectional view taken on line 4—4, Fig. 1.

Thus, if material on the conveyer is moving in the direction of the arrow in Fig. 1, as the driven conveyer 10 moves longitudinally on its forward stroke from the position shown in Fig. 1 to the other end of the stroke, moving pivot pin 24 and its guide wheel 30 to the position in Fig. 2, the links 48 and 50 pivot at their ends about the pivots 24 and 25 and impart a corresponding longitudinal movement to the conveyer 11 along its longitudinal axis, the pivot pin 25 and its guide wheel 30 being moved thereby from the position shown in Fig. 1 to the position shown in Fig. 2. The return movement or rearward stroke of the driven conveyer reverses the movements of the guide wheels 30 and links 48 and 50 to return the moving parts to the positions shown in Fig. 1.

During the reciprocating movement of the conveyers, the links and corner pan oscillate or rock back and forth, since the ends of the links and of the pan travel in straight lines.

The guide wheels 30 rolling on the straight portions 42 and 43 of the guide rods provide guide means engaged by or directly associated with the pivots to positively maintain the line conveyers to which they are connected in longitudinal alignment, and prevent any lateral movement of the line conveyer troughs. At the same time the link means 48 and 50 transmit the longitudinal reciprocating movement from conveyor 10 to conveyor 11 without requiring any laterally spaced pivotal support.

When the improved turn construction is incorporated in a shaking conveyer in a mine, for instance, the driven conveyer 10 is the main line conveyor and conveyer 11 is the face conveyer upon which the material is being loaded.

Since shaking conveyers operate with a relatively rapid rearward stroke so as to slide under the material on the conveyor, and a steady relatively slow forward stroke to carry the material forward, obviously uneven loading conditions make it desirable to accelerate the rearward movement of the face conveyer.

The oscillating movement of the links 48 and 50 produces an acceleration in the movement of pivot 25 during the first part of the rearward stroke, causing face conveyer 11 to slide under unevenly loaded material more effectively, and thus greatly improves the conveying action.

The improved construction provides a unitary conveyer turn which is capable of being connected to and disconnected from line conveyers in everyday use, and since the corner pan is symmetrical it can be used equally well for a right or left turn without modification.

By means of the improved turn construction, the corner pan and conveyer end troughs are all supported from a single base without necessitating any auxiliary supports, and the base provides anchoring points on opposite sides of the corner pan to solidly support the whole conveyer turn.

Various modifications may be made in the improved conveyer turn construction without departing from the scope of the invention as defined in the appended claims.

I claim:

1. Conveyer turn construction for a corner between two horizontally reciprocatory line conveyers having adjacent end troughs, including a pivot on each end trough, a link journalled at its ends on said pivots, and guide means engaged by the pivots for maintaining each pivot in longitudinal alignment with the line conveyer to which it is connected.

2. Conveyer turn construction for a corner between two horizontally reciprocatory line conveyers having adjacent end troughs, including a corner conveyer pan connecting the end troughs, a pivot on each end trough, a link journalled at its ends on said pivots, and guide means engaged by the pivots for maintaining each pivot in longitudinal alignment with the line conveyer to which it is connected.

3. Conveyer turn construction for a corner between two horizontally reciprocable line conveyers, including a corner pan, end troughs adapted for connection to each line conveyer, each end trough having a pivotal connection with the corner pan, a link journalled at its ends on said pivotal connections, and guide means engaged by the pivotal connections for maintaining each pivotal connection in longitudinal alignment with the line conveyer to which it is connected.

4. Conveyer turn construction for transmitting longitudinal reciprocating movement of one conveyer in one direction to another conveyer in another direction, including a base, guide means supported on the base and having a straight portion in longitudinal alignment with each conveyer, each conveyer having a member movable on one of said guide straight portions, and link means pivotally connecting the conveyer members.

5. Conveyer turn construction for transmitting longitudinal reciprocating movement of one conveyer in one direction to another conveyer in another direction, including a base, guide means supported on the base and having a straight portion in longitudinal alignment with each conveyer, a guide wheel pivotally mounted on each conveyer for rolling on one of said guide straight portions, and link means pivotally connecting the guide wheels.

6. Conveyer turn construction for transmitting longitudinal reciprocating movement of one conveyer in one direction to another conveyer in another direction, including link means having a pivotal connection with each of the conveyers, and independent straight line means directly guiding the pivotal connections for maintaining each conveyer in longitudinal alignment during its reciprocating movement.

7. Conveyer turn construction for transmitting longitudinal reciprocating movement of one conveyer in one direction to another conveyer in another direction, including a link having pivotal connections at its ends with the conveyers, guide means associated with the pivotal connections for maintaining each conveyer in longitudinal alignment during its reciprocating movement, and a corner conveyer pan mounted on the link and connecting the two conveyers.

8. Conveyer turn construction for transmitting longitudinal reciprocating movement of one conveyer in one direction to another conveyer in another direction, including link means having a pivotal connection with each conveyer, guide means engaged by the pivotal connections for maintaining each pivotal connection in longitudinal alignment with the conveyer to which it is connected, and a corner conveyer pan mounted on the link means and having its ends mounted on said pivotal connections for connecting the two conveyers.

9. Conveyer turn construction for a corner between two longitudinally reciprocable conveyers having adjacent end troughs, including a corner conveyer pan, pivot pins pivotally connecting the corner pan to the end troughs, guide means for maintaining each end through in longitudinal alignment with the conveyer to which it is connected, a guide wheel journalled on each pivot pin for rolling on said guide means, and a link journalled at its ends upon said guide wheels for transmitting longitudinal reciprocating movement from one conveyer to the other.

10. Conveyer turn construction for a corner between two horizontally reciprocatory line conveyers having adjacent end troughs, including a pivot on each end trough, means pivotally connecting the end troughs, said means including a conveyer pan portion and a motion-transmitting portion, and guide means directly guiding the pivots for maintaining each pivot in longitudinal alignment with the line conveyer to which it is connected.

11. Conveyer turn construction for a corner between two horizontally reciprocatory line conveyers having adjacent end troughs, including a pivot on each end trough, motion-transmitting means journalled at its ends on said pivots, and guide means directly guiding each pivot in a straight line longitudinally of the conveyer to which it is connected.

12. Conveyer turn construction for transmitting longitudinal reciprocating movement of one conveyer in one direction to another conveyer in another direction, including means pivotally connecting the conveyers, and independent straight line guide means engaged by the pivots for maintaining each conveyer in longitudinal alignment during its reciprocating movement.

CHARLES N. BEBINGER.